(12) United States Patent
Chandler (10) Patent No.: US 9,262,937 B2
(45) Date of Patent: Feb. 16, 2016

(54) SYSTEM AND METHOD FOR CORRELATING CURRICULA

(76) Inventor: Gregg Alan Chandler, St. Joseph, MI (US)

(*) Notice: Subject to any disclaimer, the term of this patent is extended or adjusted under 35 U.S.C. 154(b) by 888 days.

(21) Appl. No.: 12/317,599

(22) Filed: Dec. 26, 2008

(65) Prior Publication Data

US 2009/0186331 A1    Jul. 23, 2009

Related U.S. Application Data

(60) Provisional application No. 61/018,127, filed on Dec. 31, 2007.

(51) Int. Cl.
*A47B 41/00* (2006.01)
*G09B 7/02* (2006.01)

(52) U.S. Cl.
CPC .......................................... *G09B 7/02* (2013.01)

(58) Field of Classification Search
CPC ........................................................ G09B 19/00
USPC .................. 434/118, 322, 323, 350, 365, 433
See application file for complete search history.

(56) References Cited

U.S. PATENT DOCUMENTS

| | | | |
|---|---|---|---|
| 7,264,475 B1* | 9/2007 | Eck et al. | 434/322 |
| 8,632,340 B1* | 1/2014 | Schugren et al. | 434/118 |
| 2003/0074370 A1* | 4/2003 | Gargano et al. | 707/103 R |
| 2008/0138788 A1* | 6/2008 | Allen et al. | 434/365 |

OTHER PUBLICATIONS

"CTESTAR User Manual" Enthusiastic Software (2006)pp. 1-174.

* cited by examiner

*Primary Examiner* — Kesha Frisby
(74) *Attorney, Agent, or Firm* — Flynn, Thiel, Boutell & Tanis, P.C.

(57) ABSTRACT

A system and method for correlating learning objectives, curriculum items or elements or competency expectations between multiple curricula, or between a curriculum and established national, industry or governmental standards, includes multiple steps. A first curriculum, including multiple curriculum items, is selected. A second curriculum or standard, containing multiple elements, is selected. A curriculum item from within the first curriculum is selected. A filter is applied to the elements of the second curriculum or standard to produce a visible display of a subset of elements from within the second curriculum. Individual elements, from within the subset of elements, are identified as correlating to the curriculum item. The individual elements that correlate to the curriculum item are tagged, or cross-walked, to create a link between the curricula.

12 Claims, 10 Drawing Sheets

|  | First Item 1 | Second Item 2 | Third Item 3 | Fourth Item 4 | Fifth Item 5 | ... |
|---|---|---|---|---|---|---|
| First Item A |  | X |  |  |  |  |
| Second Item B | X |  | X |  |  |  |
| Third Item C |  |  | X |  |  |  |
| Fourth Item D |  |  |  |  | X |  |
| Fifth Item E |  |  |  | X |  |  |
| ... |  |  |  |  |  |  |

*Second Curriculum or Standard Set* (columns); *First Curriculum or Standard Set* (rows)

SYSTEM AND METHOD FOR CORRELATING CURRICULA

CROSS-REFERENCE TO RELATED APPLICATIONS

This application claims the benefit of U.S. Provisional Application Ser. No. 61/018,127, filed Dec. 31, 2007, which is incorporated herein in its entirety.

FIELD OF THE INVENTION

The invention relates to a system and method for correlating learning objectives or competency expectations between multiple curricula and between a curriculum and established national, industry or government standards, in particular a practice known as a curriculum "cross-walk".

BACKGROUND OF THE INVENTION

It is often necessary to document the correspondence between two differing curriculums, or between a curriculum and a set of standards. This process is generally referred to as "cross-walking" a curriculum, although many other terms such as curriculum analysis, gap analysis, et al., are also used.

In the present discussion, the term "curriculum" or "curricula" can be taken to include any set of educational standards, items in a course, or other terms used to describe the content or materials contained in a course. The goal is to establish a correspondence between the items in the two curricula, or between a curriculum and a set of standards such as a curriculum framework.

By way of example, the purpose might be to demonstrate that one method of teaching the material accomplishes the same goals as another, to establish equivalency of courses between institutions. In the alternative, it might be necessary to document a correspondence between a curriculum and a set of standards to justify additional governmental funding for a course. The curriculum cross-walk can also be used to demonstrate that the curriculum of a text book covers all of the mandated course material for a curriculum, or set of standards. It is thereby possible to demonstrate that a different curriculum addresses the same material as the alternative curriculum or as required by the set of standards.

The process of establishing this correspondence between the two curricula, or of establishing a correspondence of a curriculum to standards, is labor intensive. It is tedious to establish all of the relationships between the two sets of items.

Figure 1:
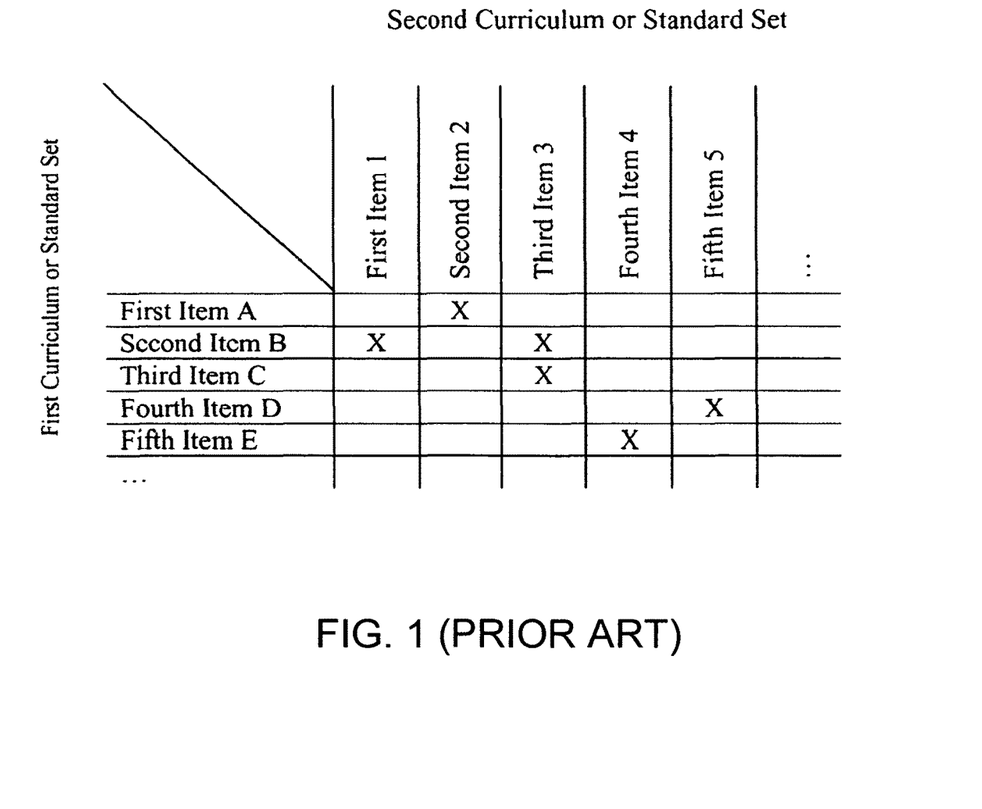
FIG. 1 is an illustration of a curriculum item matrix according to the prior art.

One can envision the process of cross-walking two curricula, or a curriculum to a set of standards, as a large matrix. There is a row for each item in the first curriculum, and a column for each item in the second curriculum or standards, as illustrated in FIG. 1. The process of determining a correspondence between one or more items can be likened to putting an "x" at the intersection of the respective row and column to establish the correspondence of the two curriculum items. In this way, an item from the first curriculum can be identified as corresponding to one or any number of items in the second curriculum. Similarly, any item in the second curriculum or standard can be identified as corresponding to any number of items from the first curriculum. To thoroughly "cross-walk" the two curricula, it is necessary to traverse the entire matrix, considering all possible combinations of rows and columns to determine which items from the first curriculum correspond to items from the second curriculum and vice versa.

Figure 2:
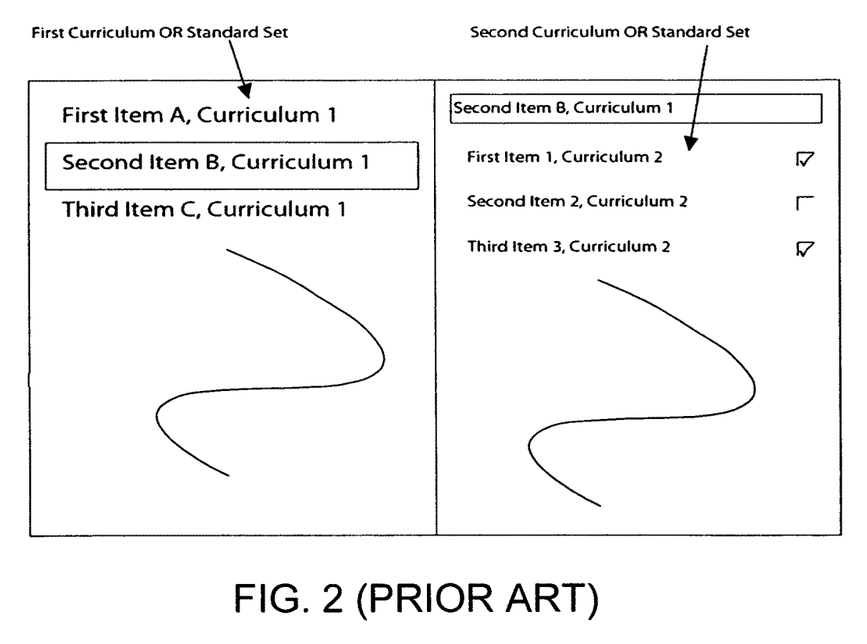
FIG. 2 is a schematic representation of a screen shot showing a prior art curriculum "crosswalk" in a side-by-side orientation.

This process has been made more manageable by the creation of computer software which presents the curriculum items in list form for review and selection by the user, as shown in FIG. 2. For example, previous versions of CTESTAR®, available from Enthusiastic Software of Benton Harbor, Mich., and commonly owned with the present application, automate the process in this manner.

The problem with the matrix approach, and its corresponding list, is that the number of combinations of items from the two sets grows as a product of the number of line items in each curriculum or set of standards. If the first curriculum has 100 items, and the second has 75 items, the number of considerations that must be done is 75 times 100, or 7,500 considerations. If the second curriculum or standard set doubles to 150 items, the number of considerations also doubles, to 15,000. It would be advantageous to provide a system or method that relieves the user of the burden of considering each possible combination of relationships, and which also ensures that relevant combinations are not overlooked.

The present invention makes this process easier, reducing the time required to complete the task, and improving the thoroughness of the completed task. The system according to the invention reduces the number of considerations that must be made in two ways: by dividing one, or both, of the curricula (or standard sets) into subsets based upon the type of material or any other criteria, and by filtering of the resulting subset based upon keywords, regular expressions, or any other arbitrary set of rules. The user of the program specifies the subset or subsets they are interested in, and also specifies terms to further reduce the number of items which must be considered.

DETAILED DESCRIPTION

In the preferred embodiment of the invention, the items from the first curriculum are displayed on the left hand side of the screen, and the items from the second curriculum, or set of standards, are displayed on the right hand side of the screen, as shown in FIG. 2. Alternate arrangements are possible—with one curriculum on the top of the screen, and the other displayed beneath it, as in FIG. 3. Yet another embodiment would display the first curriculum, and pop up a floating window for the second curriculum or set of standards, as in FIG. 4. The present invention achieves similar results regardless of the spatial orientation of the two curricula.

Figure 5:
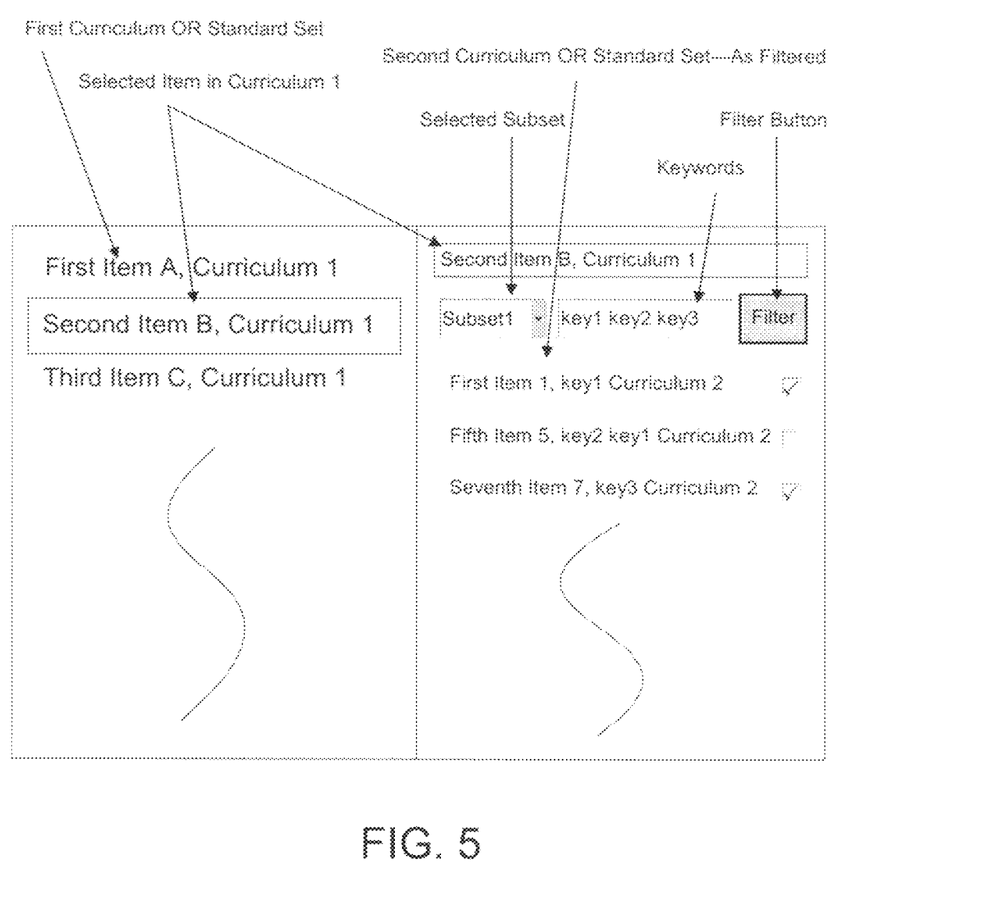
FIG. 5 is a schematic illustration of a screen shot of a side-by-side curriculum "crosswalk" utilizing the drop down menus and a filter system for selecting correlating items, according to the invention.

When one item from the first curriculum is selected, such selection will be indicated preferably according to the conventions of the underlying operating system. For instance, the selected item will display with an alternate background color, display of a checked or unchecked box, enclosure by a box, or any other suitable method devised to indicate its selection. The second curriculum screen will be updated to list the items from the second curriculum and to indicate the items from the second curriculum that correspond to the selected item in the first screen. As indicated with respect to the first screen containing items from the first curriculum, any one of a number of different techniques may be used to indicate which items from the second curriculum are selected for correspondence with the item from the first curriculum. In the preferred embodiment, as illustrated in FIG. 5, checked boxes are used to identify selected items. An item with an associated checked box indicates the item in the second panel corresponds to an item in the first. An item with an unchecked box indicates the item does not correspond. The box can be in any spatial arrangement to the item, so long as it is clear which box the item corresponds to. One alternative embodiment would be to highlight corresponding items with a contrasting color. Another embodiment would be to associate a suitable iconic indicator with the item. Any suitable indicator is acceptable.

In the preferred embodiment, the full text of each curriculum item in each curriculum panel is displayed. In the alternative, the text identifying a curriculum item could be abbreviated. Yet further, the display could include a unique alphanumeric identifier in addition to, or instead of, the full or abbreviated text identifying each curriculum item. The actual representation of the curriculum item is relevant to the extent that the user can readily recognize the curriculum item in question, and to the extent that the identifier can be contained within the screen space available.

Figure 3:
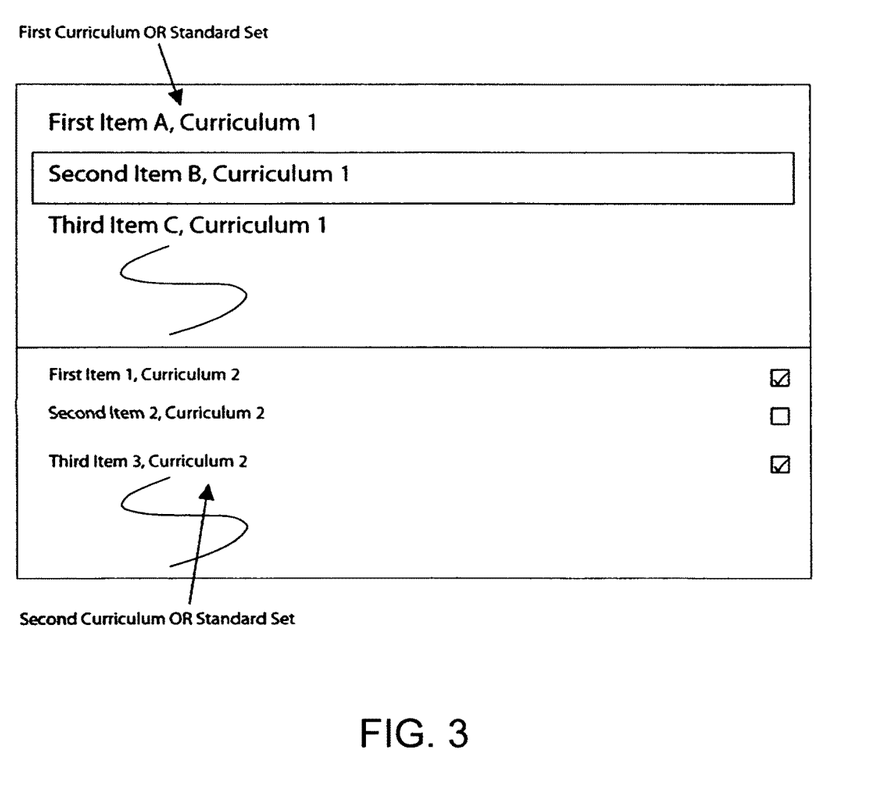
FIG. 3 is a schematic representation of a screen shot showing a curriculum "crosswalk" in an over-under representation.
Figure 4:
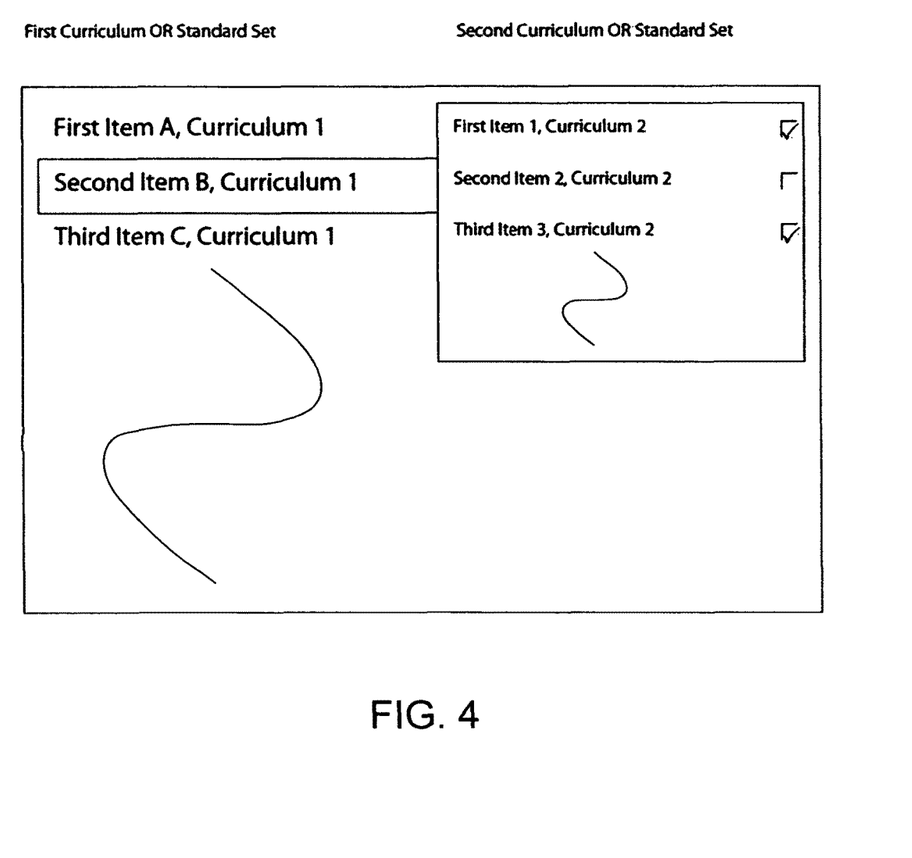
FIG. 4 is a schematic illustration of a screen shot of a curriculum "crosswalk" utilizing a pop-up window.

The previously described screens, typified by the illustrations of FIGS. 2-4, display all of the items in each curriculum or set of standards, with possible provisions made for scrolling through multiple screens, as the number of items extends beyond a single screen. The system according to the invention filters the items to be displayed in one, or both, curriculum displays. A system utilizing one or more filters for the curriculum items is illustrated in FIGS. 5-8.

Referring to FIG. 5, a first method for filtering divides the second curriculum into subsets. Such a division can be made around basic educational subjects such as: English Language Arts, Mathematics, Social Studies, and Science. Other divisions are possible, and are largely dependant on the actual curriculum or set of standards to be divided. By selecting the subset, or subsets, to be displayed, the actual items to be displayed are reduced, and the number of items to be considered when evaluating the items for potential correspondence is also reduced.

In the embodiment of FIG. 5, a drop-down list box is used to select only one of the subsets. In an alternative embodiment (not shown), more than one subset can be simultaneously selected by providing checkable boxes next to each listed subset, for example within the drop-down list, or otherwise. Yet another embodiment would provide a scrolling list with all included subsets suitably selected according to the underlying operating system conventions. It is only necessary, or sufficient, to indicate to the user which subsets are being considered, and to provide a mechanism for the user to select which subsets to consider. It is also desirable to provide a provision for automatically selecting all subsets.

Figure 6:
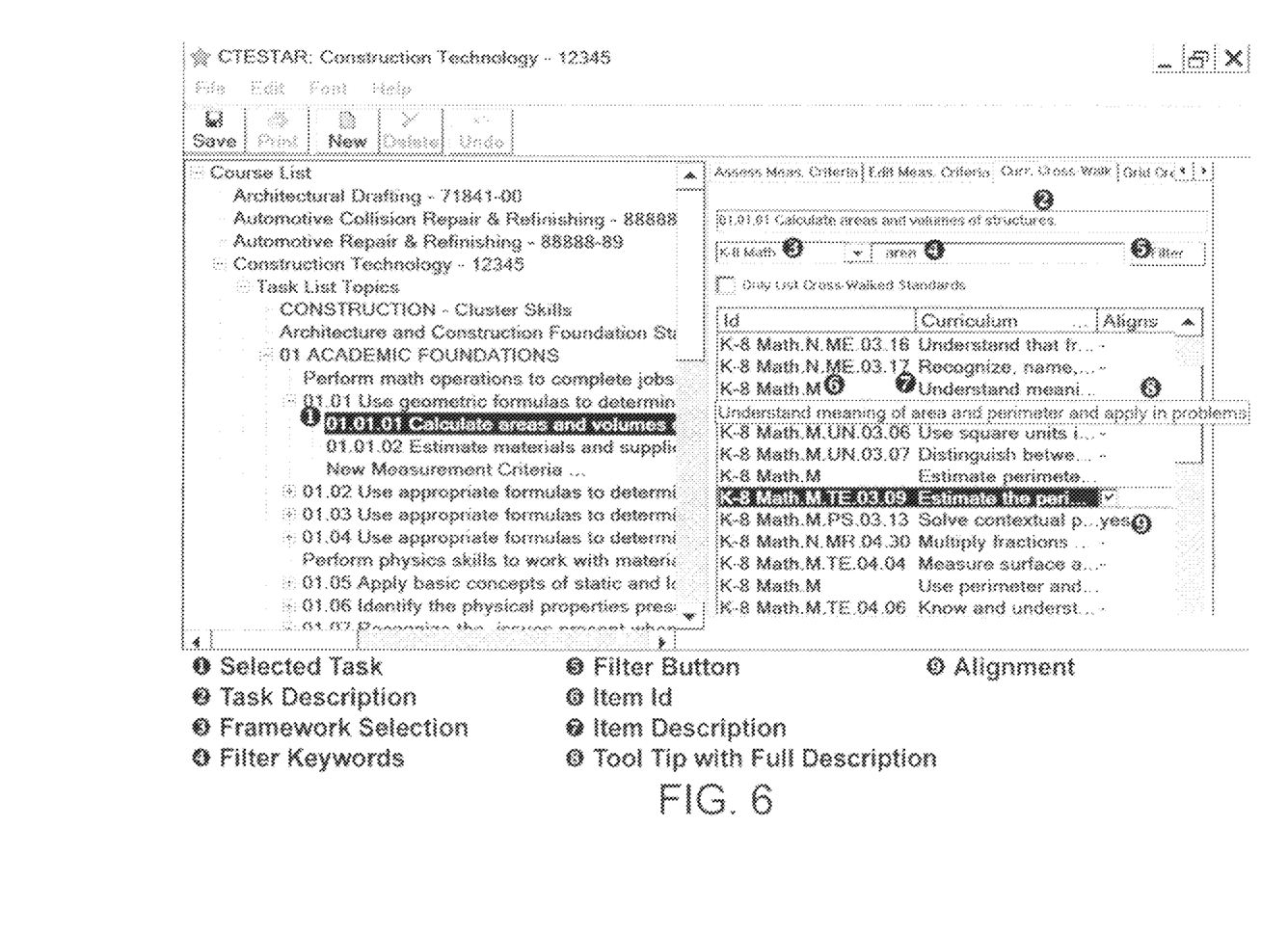
FIG. 6 is a screen shot of the current version of the CTESTAR® curriculum alignment by task, according to the invention.
Figure 7:
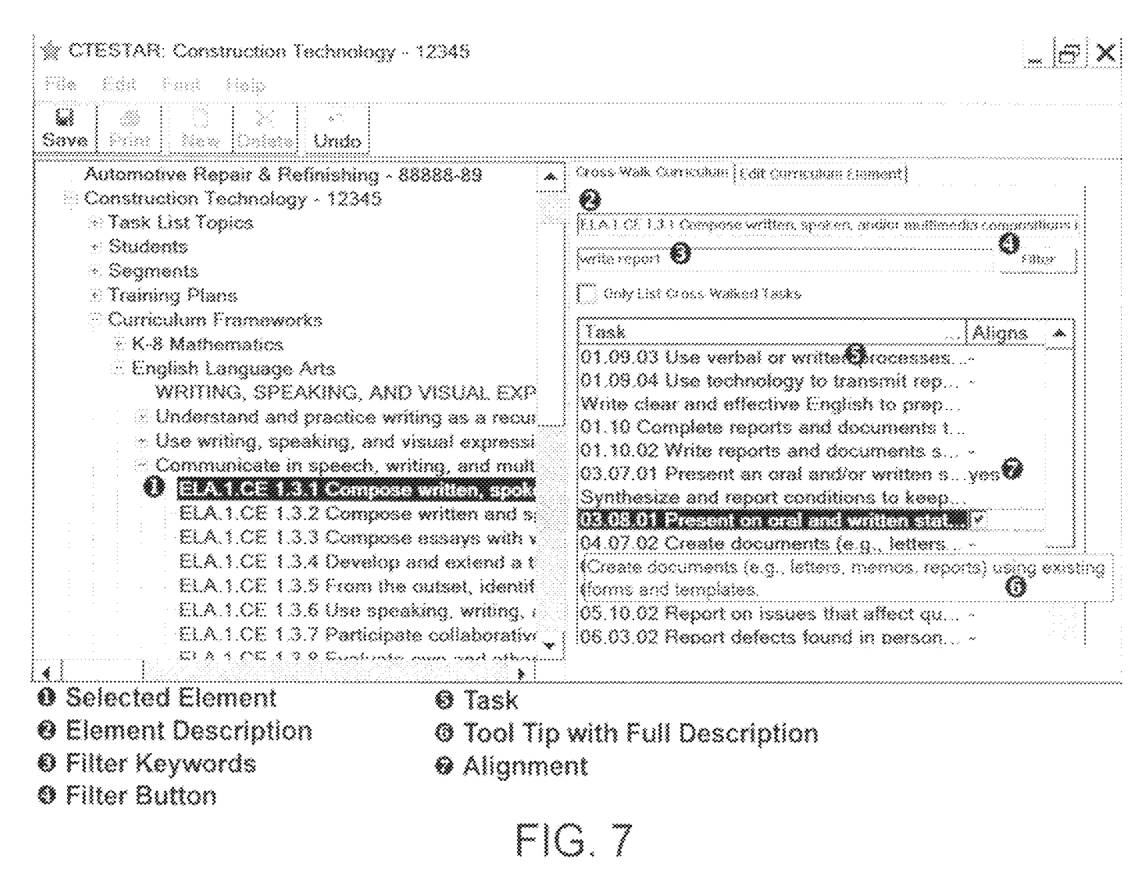
FIG. 7 is a screen shot of the current version of the CTESTAR® curriculum alignment by framework, according to the invention.

A second method for further restricting the curriculum items based upon keywords and/or partial keywords is provided, as shown in FIGS. 5-7. A field is provided for the user to enter a number of keywords, shown as key1, key2, key3 in FIG. 5. In the preferred embodiment, the text is typed into the specified field, and the curriculum items are filtered when the "Filter" button is clicked. In the alternative, the displayed items can be continuously updated as the keywords are entered. When no keywords are entered into the text box, the "filtering" results in the display of all of the second curriculum items. When this keyword filtering is combined with the previously described filtering by subset feature, as illustrated in FIG. 5, the second curriculum items will be filtered by whichever filter or filters are applied. In the preferred embodiment, the items displayed are the result of a logical "and" of the two selection mechanisms, that is, only the items that are both in the subset and which also match the keyword expression are included, although alternate embodiments with selected Boolean logic could also be used. In a further alternative embodiment of the present invention (not shown), words would be highlighted in one or both of the curricula or set of standards, and the filtering would be performed on the basis of the words so selected.

In the system described above, the keywords and partial keywords are selected to filter curriculum items that contain a match in their description for the keywords chosen. In a further embodiment of the system, keywords are attached or assigned to each of the curriculum items. A match in the keyword search could be based on these assigned keywords, alone or in combination with the contents of the description. Yet another embodiment would provide for the use of "regular expression" matching of the keywords. In another embodiment, logical expressions regarding the keywords and subset names could also be used to filter the curriculum items. The purpose of the invention is to restrict the set of curriculum items displayed, and thus reduce the time required to thoroughly consider all potential combinations of items.

Figure 8:
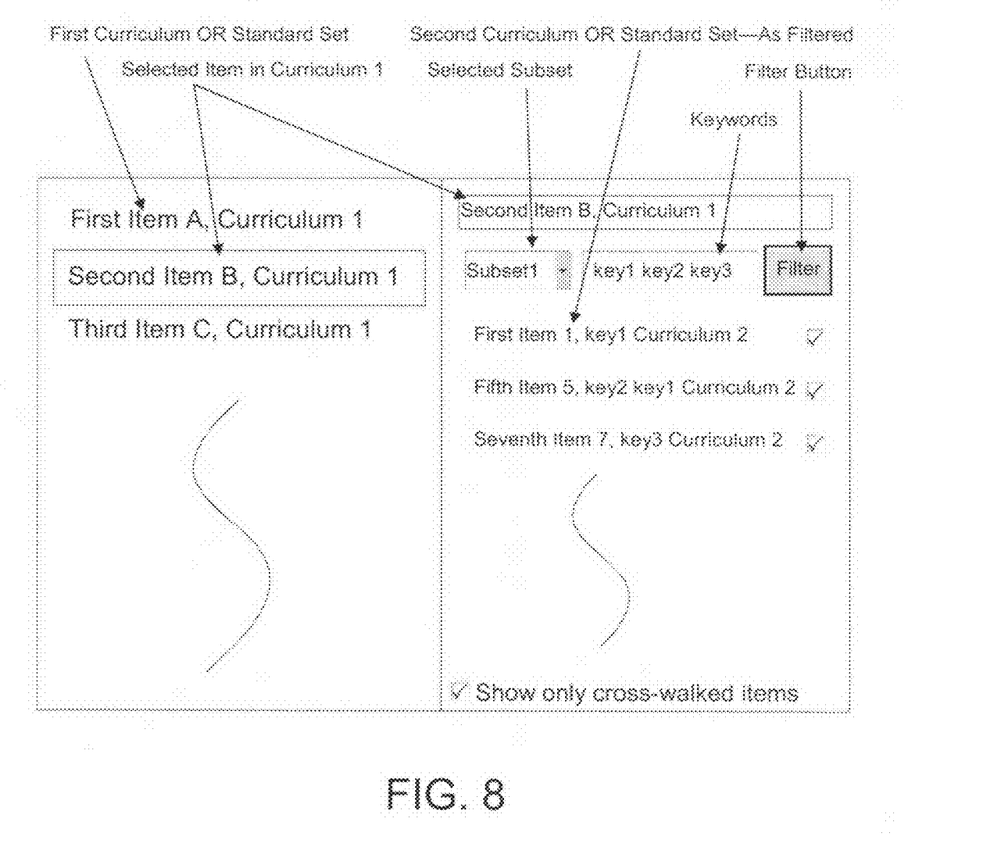
FIG. 8 is a schematic illustration of a screen shot of a side-by-side curriculum "crosswalk" utilizing the drop down menus and a filter system for selecting correlating items, according to the invention, with an additional filter to show only cross-walked items.

In a further embodiment of the invention, the display can be limited to only those second curriculum items which have already been cross-walked, as shown in FIG. 8. This can be useful to the user in bringing the cross-walked items onto fewer screens, without the clutter of non-relevant items making the list unmanageable, for the purpose of verifying the completeness of the cross-walk process.

In the preferred embodiment of the invention, as particularly shown in FIGS. 6-7, the second curriculum screen also displays the text of the selected item from the first curriculum panel. This display aids the user in comparing the restricted set of items to the selected item. After the items from the second curriculum or set of standards are appropriately displayed, the user may read through them indicating correspondence to the first curriculum through any suitable mechanism. In the preferred embodiment (see FIGS. 5 and 8), this is done through checkable boxes, however, any suitable mechanism will suffice. For example, FIGS. 6 and 7 indicate correspondence by a "yes" indicator. Once the user has considered all of the displayed items from the second curriculum or set of standards, the user may select a new item in the first curriculum. When this is done, the second curriculum or standard set display is refreshed, and the process is repeated. If necessary, the user can change the subset and/or keywords as appropriate for the newly selected item from the first curriculum, or whenever it is deemed necessary, or is convenient.

Figure 9A:
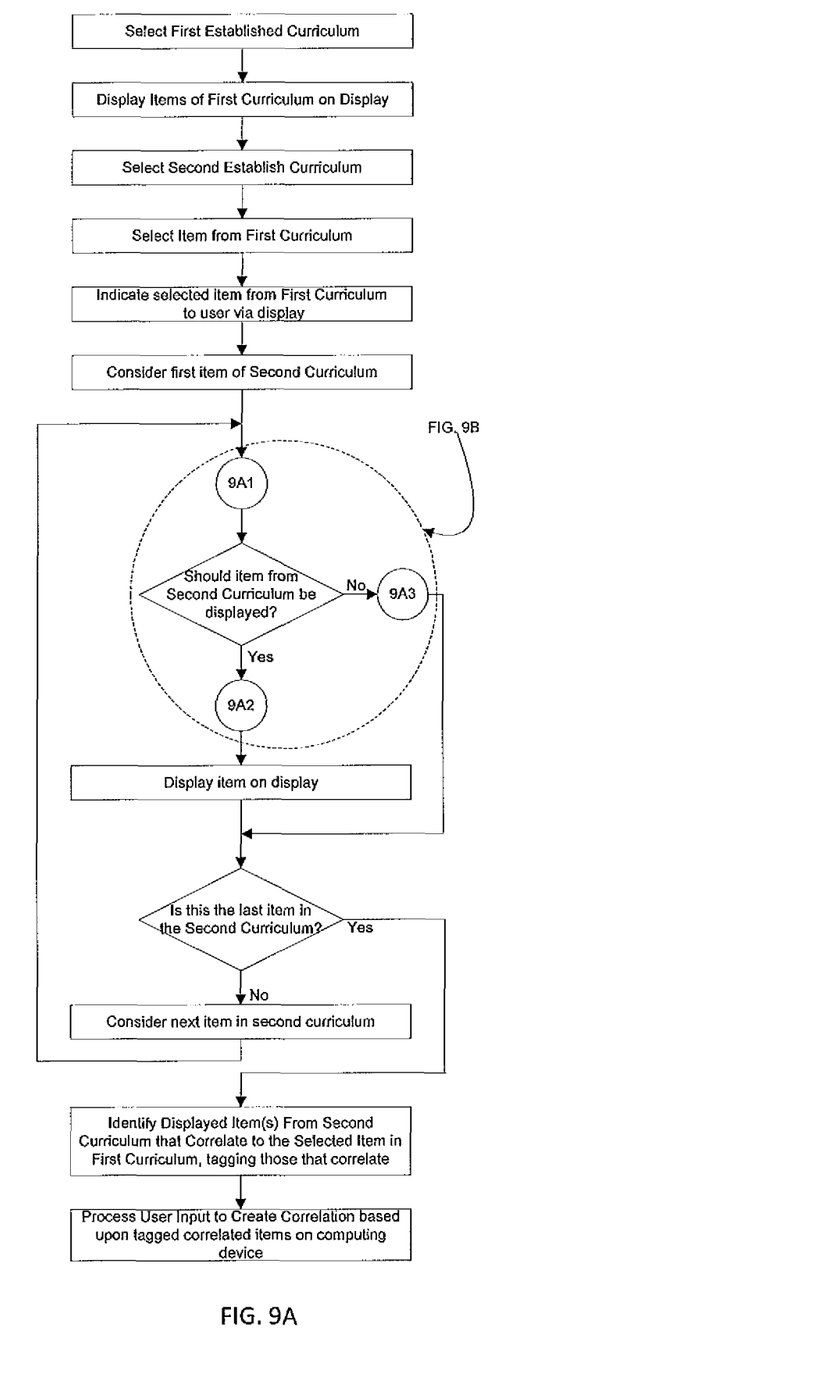
FIG. 9A is a first portion of a schematic flowchart of a method, according to the invention.
Figure 9B:
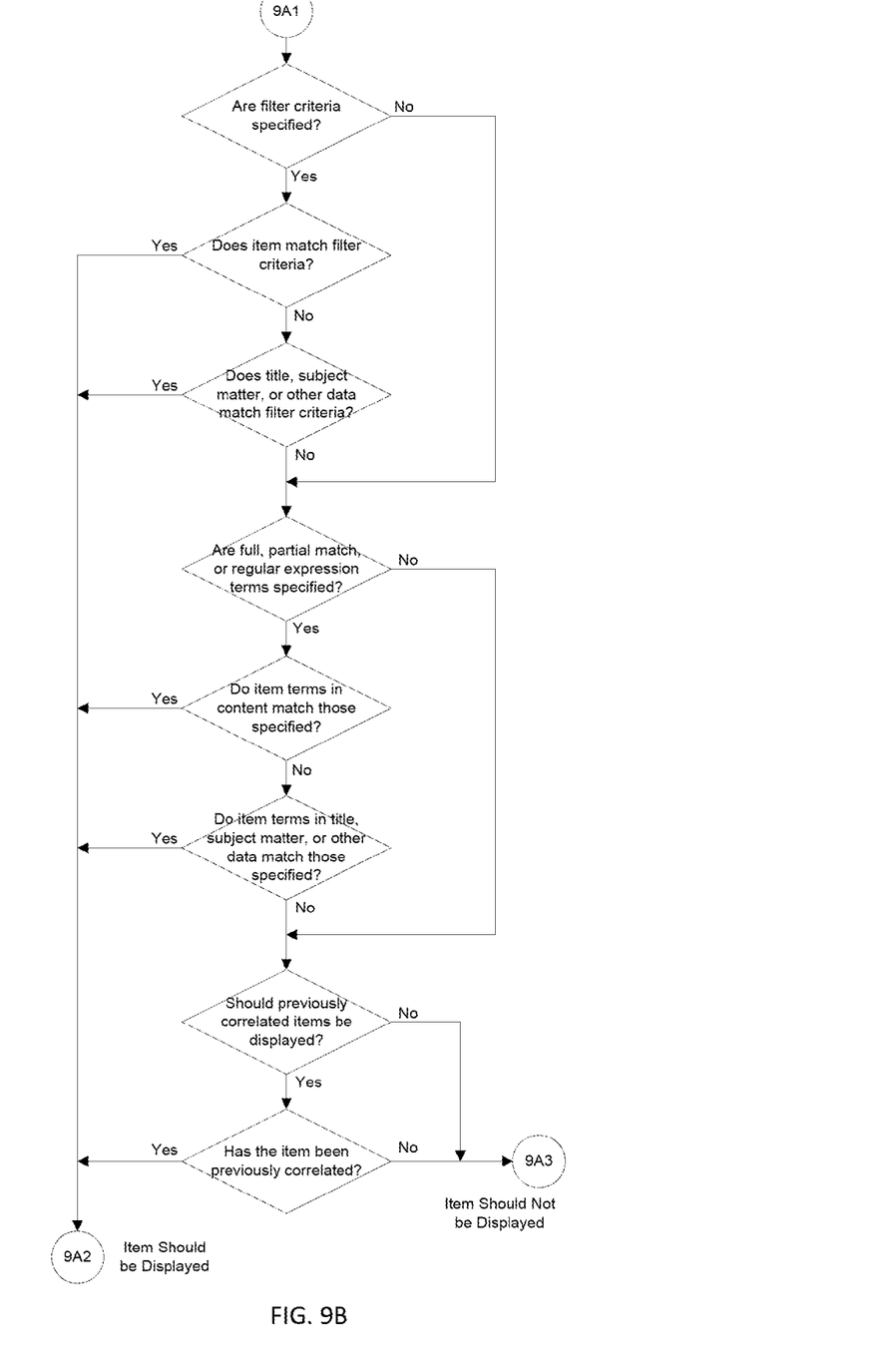
FIG. 9B is a second portion of a schematic flow chart of a method, according to the invention.

FIGS. 9A and 9B together depict a flowchart showing general steps of a preferred embodiment of a method of the present invention. FIG. 9A shows many of steps of the preferred method, and FIG. 9B shows the remainder of the steps, the location of which is depicted generally as a hidden-line circle on FIG. 9A, of the preferred method.

Although the present invention addresses establishing the correspondence between two curricula, or a curriculum and a set of standards, it generally applies to the establishing of correspondence between any two arbitrary sets of items.

Although particular preferred embodiments of the invention have been disclosed in detail for illustrative purposes, it will be recognized that variations or modifications of the disclosed apparatus, including the rearrangement of parts or steps thereof, lie within the scope of the present invention.

What is claimed is:

1. A method for correlating learning objectives, curriculum items or elements or competency expectations between multiple established curricula, or between an established curriculum and established national, industry or governmental standards, comprising the steps of:
    providing a computing device with a connected electronic display apparatus;
    selecting a first established curriculum containing a plurality of curriculum items and displaying one or more of said items on said electronic display apparatus;
    selecting a curriculum item from within said first established curriculum;
    providing a second established curriculum or a standard containing a plurality of elements and displaying one or more of said elements on said electronic display apparatus;
    using said computing device to filter the content of said elements of said second established curriculum or standard by one or more electronic filtering mechanisms to reduce and restrict the number of elements to be displayed for consideration by the user and to produce a visible display on the electronic display apparatus of a subset of elements from within said second established curriculum or standard;
    identifying at least one element from within said subset of elements from the second established curriculum that correlates to said curriculum item selected from the first established curriculum;
    using said computing device to tag said at least one element from within the subset of elements from the second established curriculum that correlates to said curriculum item selected from the first established curriculum, to indicate correspondence between said at least one element from within the subset from the second established curriculum and said curriculum item from the first established curriculum;
    using said at least one tagged element and said curriculum item selected from the first established curriculum to establish and to display on the electronic display apparatus a correlation or lack thereof between said at least one tagged element from said subset of elements from said second established curriculum and said curriculum item from the first established curriculum; and
    using said correlation or lack thereof to determine whether the second established curriculum addresses the same material as the first established curriculum.

2. The method of claim 1, wherein said curriculum items and said elements are each comprised of at least one term, and said step of applying a filter further comprises selecting an item based on a term or part of a term to filter the content of said elements and create said subset of elements from within said second curriculum.

3. The method of claim 1, wherein each of said curriculum items and each of said elements include a title and a subject matter description, and said step of applying a filter further comprises searching for a term or a part of a term within said title or subject matter description.

4. The method of claim 1, further comprising the step of applying a filter to display only elements that have been previously marked.

5. A method for correlating learning objectives, curriculum items or elements or competency expectations between multiple curricula, or between a curriculum and established national, industry or governmental standards, comprising the steps of:
    providing a computing device with a connected display apparatus;
    displaying, on said display apparatus, one or more curriculum identifiers;
    selecting a first established curriculum from the curriculum identifiers, the first established curriculum containing a plurality of curriculum items;
    selecting a curriculum item from within said first established curriculum;
    providing a second established curriculum from the curriculum identifiers, the second established curriculum containing a plurality of elements;
    using said computing device to filter the content of said elements of said second established curriculum by one or more electronic filtering mechanisms to reduce and restrict the number of elements for consideration by the user for potential correspondence to at least one item of the first established curriculum and to produce a visible display on the display apparatus of a subset of elements for potential correspondence from within said second established curriculum;
    using said computing device to correspond at least one element from the subset of elements of the second established curriculum to at least one curriculum item from said first established curriculum to create a correspondence; and
    using the correspondence to demonstrate a correlation or lack thereof between the first established curriculum items and the second established curriculum elements.

6. The method of claim 5, wherein said step of applying a filter comprises selecting a subset of elements that contain a marker indicating correlation to said curriculum item.

7. The method of claim 5, wherein said first curriculum comprises a curriculum framework containing a plurality of curriculum framework elements, and said second curriculum comprises a listing of tasks.

8. The method of claim 5, wherein said first curriculum comprises a plurality of tasks, and said second curriculum comprises a plurality of curriculum framework items.

9. The method of claim 8, wherein said step of using said computing device to filter the content of said elements further comprises selecting a curriculum framework.

10. The method of claim 9, wherein said step of applying a filter further comprises selecting an item based on a term or part of a term.

11. The method of claim 9, wherein said step of applying a filter further comprises selecting an item based on a term or part of a term from a title or description of said curriculum framework items.

12. The method of claim 8, wherein said step of applying a filter further comprises selecting an item based on a term or part of a term from a title or description of said curriculum framework items.

\* \* \* \* \*